2,954,343

BACTERIA INHIBITED SOLUBLE OIL EMULSION

Herbert J. Pitman, Groves, Tex., assignor to Texaco Inc., a corporation of Delaware No Drawing. Filed Dec. 6, 1957, Ser. No. 700,973

6 Claims. (Cl. 252—33.3)

This invention relates to a bacteria inhibited soluble oil emulsion. More particularly it relates to a bactericide containing soluble oil emulsion particularly useful as a metal working lubricant.

Soluble oils generally are composed of mineral oil or mixtuers of mineral and vegetable oils, and an emulsifying agent to lower the interfacial tension between the oil and water whereby emulsions of the oil-in-water type may be easily formed. The emulsifying agents commonly used include soaps of petroleum sulfonic acids, naphthenic acids, fatty acids, rosin and tall oil.

Soluble oils usually contain coupling agents and small amounts of water to stabilize the composition prior to emulsification with much larger quantities of water. Various lubricant additives are also used to correct or improve certain characteristics of the soluble oil or soluble oil emulsion.

The soluble oil itself is shipped to the user in a substantially sterile conditions. However, bacteria can be introduced in an emulsified soluble oil either through the water used in the preparation thereof or through contamination by the workers or from the air during use. The bacteria, if allowed to grow unchecked, will eventually cause breakdown of the emulsion and curtail the use for which it was intended.

In addition to the above occurrence, a serious odor problem is created by certain bacterial growth in the emulsion used as a metal working fluid. It is believed that initially the growth of certain aerobic bacteria takes place with a resulting slight breakdown of the emulsion. During shutdown periods of the metal working machiner, as on weekends and holidays, certain anaerobic sulfate reducing bacteria grow quickly in the used emulsion due to the lack of aeration in the open system and to the conditions or material provided by the prior growth of certain aerobic bacteria in the fluid. The presence of large amounts of sulfate reducing bacteria causes severe odor problems due to the formation of sulfides and the odor is particularly noticeable on Monday mornings after weekend shutdown periods. The presence of anaerobic bacteria also causes a quicker and more severe emulsion breakdown than bacteria produced under aerobic conditions necessitating draining and cleaning of the metal working fluid system and the addition of new metal working fluid.

The problem of finding a satisfactory bacterial inhibitor for a soluble oil emulsion is made difficult by a number of factors which must be considered. These factors include toxicity, emulsion degradation, additive compatibility and destruction growth inhibition of harmful bacteria for a sufficient period during the life of the oil.

In accordance with the present invention a soluble oil emulsion which will meet the above requirements includes a bacteria inhibiting amount of 3,5-dialkyltetrahydro-1,3,5-(2H)-thiadiazine-2-thione wherein the alkyl group have from 1 to 4 carbon atoms. The amount of this compound which is useful in inhibiting bacterial growth in soluble oil emulsions ranges from 100 to 1000 p.p.m. The preferred compound is 3,5-dimethyltetrahydro 1,3,5-(2H)-thiadiazine-2-thione and the preferred amount of this compound which is used for inhibiting bacterial growth in a soluble oil emulsion is about 500 p.p.m.

The soluble oil-in-water emulsions are formed with water to oil ratios ranging from 5:1 to 100:1. The more dilute emulsions, from 25:1 to 100:1 are preferred for cutting fluids which are used as lubricants and coolants in high speed metal turning operations.

The soluble oil prior to emulsification mainly comprises a mineral lubricating oil and an emulsifying agent. The mineral oil is preferably a naphthene base distillate oil although mixed paraffin-naphthene base distillate oils are at times effectively employed. Naphthene base distillate fractions are desirable because of their better emulsification properties and stability. In general, refined base oils fractions having an SUS at 100° F. between 70 and 800 are used in the formulation of the soluble oils of this invention.

The emulsifying agents useful in the present invention are those known in the art. Examples of these emulsifiers include oil soluble metal petroleum sulfonates, alkali metal naphthanates, and resinates, salts of fatty and carboxylic acids, such as guanidine salts of high molecular weight fatty acids and alkylolamine salts of carboxylic acids containing at least 10 carbon atoms, alkali metal salts of tall oil, etc. These soaps or salts are usually formed with sodium because of the lower cost and availability, but potassium is also used. Mixtures of emulsifiers, for example a mixture of sodium naphthenate and sodium petroleum sulfonate, a mixture of sodium resinate, sodium naphthenate and sodium petroleum sulfonate, and a mixture of guanidine stearate and triethanolamine stearate have been found extremely useful. The total emulsifier concentration is between 10 and 20 percent by weight of the total soluble oil composition with concentrations between 12 and 16 percent usually employed.

Minor amounts of coupling agents are also advantageously employed in the soluble oil composition to improve the stability thereof. Those coupling agents useful in this invention include mono and polyhydroxy alcohols, ether-alcohols and phenols. Examples of these compounds include ethyl, isopropyl, n-propyl, isobutyl, n-butyl and n-amyl alcohols; ethyleneglycol, diethylene glycol and propylene glycol ethylene glycol alkyl esters wherein the alkyl group has from 1 to 8 carbon atoms, for example, ethylene glycol monoethylether (Cellosolve), ethylene glycol monoisopropylether, ethylene glycol monobutylether, ethylene glycol mono-n-pentylether, ethylene glycol mono-n-hexylether, diethylene glycol monoethylether (Carbitol), diethylene glycol monobutylether and cresol. The concentration of the coupling agents in the soluble oils is usually between 0.1 and 1.5 percent by weight. A preferred coupling agent is ethylene glycol monobutylether at a concentration of about 0.6–1.0 percent by weight.

In preparing the soluble oil of this invention a small amount of water is preferably used to make the soluble oil fluid and to prevent oil separation, or stratification of the emulsion, upon mixing the soluble oil with much larger amounts of water. The water content, to stabilize the oil, usually falls between 1 and 4 weight percent. A water content of about 2 percent has been found to be particularly effective in these soluble oils.

Other useful lubricant additives, to improve certain characteristics of the soluble oil, are at times used in the composition. These include, for example, rust preventatives such as triethanolamine and the like, extreme pressure and oiliness agents, and settling agents.

The bactericide of the invention is incorporated in the emulsion at the time it is prepared and before any serious bacterial problem occurs, or it is added to the emulsion after a bacterial problem is evident thereby correcting said problem before serious degradation of the emulsion occurs.

In order to determine the value of compounds known or expected to have bacteria destroying properties in water solutions, as bactericides in soluble oil emulsions, a screening test was used. This test consisted of preparing the cutting fluids or soluble oil emulsions and adding 100, 500, and 1000 p.p.m. of each bactericide to 20 ml. of the emulsion in test tubes. The tubes were then autoclaved at 15 pounds steam pressure for 15 minutes. After the tubes had cooled to atmospheric temperature, 0.5 ml. of a composite used cutting oil sample or inoculum was prepared by mixing the "spoiled" cutting oil samples of several users. The bacterial content of the inoculum was determined and in every case the tubes were inoculated with a standard known number of viable bacteria. Tubes of sterile uninhibited uninoculated emulsions and uninhibited inoculated emulsions were employed as controls. All tubes were placed on a shaking machine making 209 oscillations per minute. Immediately after inoculation of the emulsions and at 24 hour intervals for a period of 7 days, each tube was tested for the presence of viable bacteria by inoculating nutrient broth with a small standard volume of emulsion. The broth tubes were incubated for 48 hours and then examined for bacterial growth. Those bactericides which caused the inoculated emulsions to become sterile within the seven day test period were considered promising and were subjected to further testing. Of over 250 known water solution bactericides tested in the above manner less than a third were considered promising as bactericides in soluble oils.

Effective materials found with the above test procedure were further tested in an Open System Test. The procedure consisted of placing 3.0 gms. of powdered iron and 3000 ml. of a soluble oil emulsion consisting of 25 parts of water to one part of a soluble oil comprising a naphthene base distillate oil having an SUS viscosity of 100° F. of about 70, 7.5 percent sodium resinate, 0.5 percent triethanol amine, 12.0 percent sodium petroleum sulfonate, 1.0 percent ethyleneglycol monobutylether and 2.0 percent water, and the experimental bactericide in a one gallon jar and inoculating with a known quantity of bacteria. The system was then aerated for 5 days and allowed to stand quiescent for 2 days each week. Immediately after inoculation and twice a week thereafter duplicate standard plate counts were made. The inhibitors were considered effective as long as bacteria counts remained less than 1000/ml.

The following table shows the results of the Open System Test on the potential bactericides:

Table 1

| | No. of Effective Days of Inhibition | | |
|---|---|---|---|
| | 100 p.p.m. | 500 p.p.m. | 1,000 p.p.m. |
| Sodium o-phenyl phenol | | | 32 |
| o-Phenyl phenol | 0 | 32 | 39 |
| Resorcinol | | | 0 |
| Resorcinol dibenzoate | | | 0 |
| Alkylamine o-phenyl phenol | 0 | 0 | 0 |
| Mercuric naphthenate | 0 | 4 | 4 |
| Zinc salt of alkyl-n-propylene-diamine pentachlorophenol | | | 0 |
| Pentachlorophenol | | | 0 |
| Mixture of tetradecylamine and o-phenyl phenol | | | 0 |
| Dichlorophene | | 0 | 28 |
| Copper naphthenate, 8% | | 0 | 0 |
| Oxochloramide | 11 | 14 | 21 |
| Mixture of 4 and 6 chloro-2-phenyl phenol | 0 | 0 | 18 |
| Methylene bis-phenol | 0 | 0 | 0 |
| Tetrachlorophenol | 0 | 0 | 0 |
| Dimethylaminomethyl phenol | 0 | 0 | 18 |

Table I—Continued

| | No. of Effective Days of Inhibition | | |
|---|---|---|---|
| | 100 p.p.m. | 500 p.p.m. | 1,000 p.p.m. |
| 2,4,6-Tri (dimethylamino-methyl phenol) | 0 | 18 | 18 |
| Beta-propiolactone | | | 26 |
| Diethyl acid pyrophosphate | | 2 | 20 |
| 2-Methyl-1,4-naphthoquinone | | | 26 |
| 2-Phenyl ethylamine | | 8 | 26 |
| Malonic acid | | | 8 |
| 1,2-Dibromo-1,1-dichloro-ethane | | 0 | 0 |
| Hydroxylamine, HCl sol | 20 | 22 | 26 |
| Mixture of 2,8-diamino-10-methyl acridinium and 2,8-diamino acridine | | | 8 |
| Mixture of 2,8-diamino-10-methyl acridinium and 2,8-diamino acridine, HCl. Sol | | | 2 |
| m-Dichloroxylenol | | | 36 |
| Phenyl mercuric acetate, 10% sol | | 27 | 27 |
| Organic mercurial (exact chemical composition not known) | | | 22 |
| 1,2-Dichlorohexafluorocyclopentene-1 | | | 0 |
| Cyclohexyl chloride | | | 0 |
| 2-Amino,1,4 naphthoquinone | 10 | 36 | 30 |
| Propyl-p-hydroxybenzoate | | | 8 |
| Butyl-p-hydroxybenzoate | | | 2 |
| Lauryl bromoisoquinolinium | | | 2 |
| Phenyl mercuric monoethanolammonium acetate | | | 53 |
| Zinc salt of dimethyl dithiocarbamic acid | | | 26 |
| 5-Chloro-2-phenyl mercurioxybenzoic acid | 26 | | |
| Sodium salt of dibromohydroxy mercuric fluorescein (mercurochrome) | | 9 | 31 |
| Phenyl mercuric salicylate | | 15 | 15 |
| Morpholine silicofluoride | | | 2 |
| Rosin amine silicofluoride | | | 2 |
| 1-Hydroxy-2-(1H)-pyridinethione (zinc salt) | | | 9 |
| 1-Hydroxy-2-(1H)-pyridinethione (copper salt) | | | 13 |
| 1-Hydroxy-2-(1H)-pyridinethione (manganese salt) | | | [1] 50+ |
| 3,5-Dimethyltetrahydro-1,3,5-(2H)-thiadiazine-2-thione | | 88 | 124+ |

[1] Completely broke the emulsion.

The excellence of 3,5-dimethyltetrahydro-1,3,5-(2H)-thiadiazine-2-thione as a bactericide in a soluble oil emulsion is well demonstrated in the above table. The fact that aerobic growth is destroyed by the bactericide ensures the inhibition of anerobic growth since, as earlier stated, the conditions or material provided by prior aerobic growth is necessary for later growth of anaerobic sulfate reducing bacteria. The unexpected bacterial inhibiting effect of this compound is further demonstrated by the fact that the zinc, copper and manganese salts of hydroxypyridinethione, compounds which are very closely related to 3,5-dimethyltetrahydro-1,3,5-(2H)-thiadiazine-2-thione, are quite ineffective or break the emulsion.

Obviously, many modifications and variations of the invention, as hereinbefore set forth, may be made without departing from the spirit and scope thereof, and therefore only such limitations should be imposed as are indicated in the appended claims.

I claim:

1. An improved soluble oil emulsion comprising from about 5 to 100 parts of water to about 1 part of an emulsifiable mineral lubricating oil, and a bacteria destroying and inhibiting amount in about the range 100–1000 parts per million of the said emulsion of 3,5-dialkyltetrahydro-1,3,5-(2H)-thiadiazine-2-thione wherein the alkyl groups have from 1 to 4 carbon atoms.

2. An improved soluble oil emulsion comprising from about 5 to 100 parts of water to about one part of a soluble oil composition comprising a major proportion of a mineral lubricating oil, and from 10 to 20 percent by weight of an oil-in-water emulsifying agent selected from the group consisting of oil-soluble metal petroleum sulfonates, alkali metal naphthenates and resinates, salts of carboxylic acids, alkali metal salts of tall oil, and mixtures thereof; and from 100 to 1000 parts per million of 3,5 dialkyltetrahydro-1,3,5-(2H)-thiadiazine-2-thione wherein the alkyl groups have from 1 to 4 carbon atoms.

3. An improved soluble oil emulsion as described in claim 2 wherein the alkyl groups are methyl.

4. An improved soluble oil emulsion comprising from about 25 to 100 parts of water to about one part of a soluble oil composition comprising a major proportion of a naphthene base distillate oil having an SUS viscosity range at 100° F. of 70 to 800, from 10 to 20 percent by weight of an alkali metal salt of a compound selected from the group consisting of naphthenic acid, sulfonic acid, rosin and mixtures thereof, from 0.1 to 1.5 percent by weight of a coupling agent selected from the group consisting of monohydroxy alcohols, polyhydroxy alcohols, ether-alcohols, phenols and mixtures thereof, and from about 1 to 4 percent by weight of water; and from 100 to 1000 parts per million of 3,5-dialkyltetrahydro-1,3,5-(2H)-thiadiazine-2-thione, said alkyl groups having from 1 to 4 carbon atoms.

5. An improved soluble oil emulsion as described in claim 4 wherein said alkyl groups are methyl.

6. An improved soluble oil emulsion comprising from about 25 to 100 parts of water, about one part of a soluble oil composition comprising a major proportion of a naphthene base distillate oil having an SUS viscosity range at 100° F. of from 70 to 800, from 12 to 16 percent by weight of a sodium salt of a compound selected from the group consisting of naphthenic acid, sulfonic acid, rosin and mixtures thereof, from 0.1 to 1.5 percent by weight of an ethylene glycol alkylether wherein the alkyl group has from 1 to 8 carbon atoms, and from about 1 to 4 percent by weight of water; and about 500 parts per million of 3,5-dimethyltetrahydro-1,3,5-(2H)-thiadiazine-2-thione.

References Cited in the file of this patent

UNITED STATES PATENTS

| | | |
|---|---|---|
| 2,653,909 | Frazier | Sept. 29, 1953 |
| 2,780,598 | Cafcas | Feb. 5, 1957 |
| 2,838,389 | Yoder | June 10, 1958 |

OTHER REFERENCES

"Disinfection of Soluble Oil Emulsions," by Pivnick et al., Lubrication Engineering, March 1957, pp. 151–153.